Aug. 19, 1969   K. SCHOLZEL   3,462,304
STORAGE BATTERY
Filed Oct. 23, 1964

United States Patent Office

3,462,304
Patented Aug. 19, 1969

---

3,462,304
STORAGE BATTERY
Karl Scholzel, Bad Soden, Germany, assignor to Werner Greutert, Baden, Switzerland
Filed Oct. 23, 1964, Ser. No. 406,057
Claims priority, application Switzerland, Oct. 25, 1963, 13,158/63
Int. Cl. H01m 27/04; B01k 3/12
U.S. Cl. 136—6                                    10 Claims The invention relates to rechargeable electric cells or batteries and to methods of assembly thereof.

Numerous types of batteries are known. For example, there is known a lead battery with a negative lead electrode, a positive electrode of lead dioxide and dilute sulfuric acid as an electrolyte. Also known is the Edison cell or battery which comprises a negative iron electrode, a positive electrode with nickel oxide and an aqueous caustic potash solution as an electrolyte. Cadmium may be used instead of iron as the negative electrode. Under certain conditions these batteries may even be operated when closed in a gas-tight manner. Batteries are also known which contain zinc or cadmium as the negative electrode, silver oxide as the positive electrode and a caustic potash solution as an electrolyte; however, such batteries lose their capacity after only several charging and discharging cycles.

All of these above batteries have a number of defects, viz, that they require comparatively large amounts of comparatively heavy carrier material for the electrode plates and the mounting of the active material on the carrier frame involves difficulties with respect to the uniformity of the material applied and of the unobstructed entry and passage of the liquid electrolyte. Moreover, these batteries have the disadvantage of having a relatively short life, since they soon become useless due to irreversible changes of their active mass.

The present invention avoids these defects by providing a battery with a negative electrode which, in the non-charged or discharged state of the battery, consists of mercury or an alkali metal amalgam and/or alkaline-earth metal amalgam, and which, upon charging, receives alkali metal cations and/or alkaline-earth metal cations from the electrolyte. The electrolyte is an aqueous alkali liquor and/or an alkaline-earth liquor. The negative electrode amalgamates the aforementioned cations as alkali metal and/or alkaline-earth metal and, upon discharging, delivers the same cations to the electrolyte and is regenerated to mercury or to an alkali metal amalgam and/or alkaline-earth metal amalgam of lower concentration. The battery has a positive electrode which, in the non-charged or discharged state of the battery, consists of mercury or of a mixture of mercury and an oxidation product of mercury and which, upon charging, receives OH-ions from the electrolyte and converts the same to a mercury/oxygen compound, and which, upon discharging, delivers OH-anions to the electrolyte and is regenerated to mercury, so that, in the discharged state of the battery, depending on the extent of the discharge and the quantitative proportion of the two electrodes relative to each other, either both electrodes consist of substantially pure mercury (state of complete discharge of a battery according to the invention with equivalent electrode weights) or one of the electrodes consists solely of mercury and the other one is constituted of mercury with mercury oxide or of alkali metal amalgam and/or alkaline-earth metal amalgam of low concentration (battery without voltage with only partial discharge of one of the electrodes in a battery according to the invention with an overdimensioned electrode with respect to the state of equivalence of the electrodes), or one of the electrodes consists of an alkali metal amalgam and/or alkaline-earth metal amalgam of low concentration and the other electrode consists of mercury and a small amount of merucry oxide (incompletely discharged state of the battery).

The concentration of the amalgam of the negative electrode depends on the charging state and on the weight ratio of the mercury in the two electrodes. For example, if the positive electrode consists of 100 g. of mercury and the negative electrode consists of 500 g. of mercury, and if the electrolyte used is an aqueous solution of 50 g. of sodium hydroxide, the positive electrode consists, after complete charging, of about 108 g. of mercury oxide, the negative electrode consists of a 4.4 percent sodium amalgam, while the electrolyte still contains about 10 g. of sodium hydroxide.

The electrode base material used for the battery may be technically pure, commercial mercury. In the completely discharged state, the electrodes consists of mercury only.

The electrolyte of the battery according to the invention contains, besides water and a hydroxide of sodium, potassium, lithium, rubidium or cesium or several of such hydroxides and/or possibly a hydroxide of calcium, barium, strontium or magnesium or several of such hydroxides, no anions other than OH-ions and no cations other than substances giving off alkali metal cations and/or alkaline-earth metal cations during the charging of the battery. Thus, instead of consisting of a pure aqueous solution of one or more alkali hydroxides, it may consist of a solution which additionally contains a small amount of, dissolved and possibly suspended, alkaline-earth hydroxides (calcium, barium, strontium, and magnesium), or else, possibly, of a solution which contains no alkali hydroxide, but only one or more alkaline-earth hydroxides, in which case, especially in the case of calcium hydroxide, strontium hydroxide and magnesium hydroxide, it is preferable to use a solution with a solid phase from which the electrolytic solution is enriched continuously, so that the internal resistance remains constant.

The battery according to the invention is constructed in such a manner that the electrodes are spaced from one another and are connected to each other within the battery only by way of the electrolyte which is in contact with both electrodes. (The battery is utilized by making connection with the electrodes in an external circuit as is well known.)

The battery can also be assembled by using a first electrode constituted of an alkali metal and/or alkaline-earth metal amalgam and a second electrode constituted of mercury oxide or of a mixture of mercury and mercury oxide.

Since mercury is used as the material for the OH-ion absorbing electrode, the mercury oxidation product assumes the form of small particles on the surface of the mercury, which are readily movable with respect to each other and with respect to the mercury and the electrolytic liquid, collectively as a large-surface mass which does not obstruct the contact of the electrolyte with the conductive mercury. The mercury oxidation product is readily reducible to mercury upon discharge, and since the formation of amalgam with the alkali metal atoms in the mercury of the negative electrode occurs, during charging, uniformly throughout the mass of said electrode, the battery according to the invention is advantageously formed simply by filling mercury into electrode chambers of a battery casing and then subsequently charging the battery.

A special advantage of a battery according to the invention is the practically complete and permanent reversibility, the non-existence of large amounts of a carrier, the absence of sensitivity to overcharging or storing in charged or semi-discharged state, the constancy of the current delivered and, above all, the easy accessibility of the active connection (mercury oxide) at the electrode charged with positive current during charging. If an alkali solution of medium concentration is used, the battery has a low internal resistance and a high specific capacity; it is not sensitive to polarity reversal, to overcharging and to being left in charged, semi-charged or completely discharged state; it can be recharged any number of times by applying a source of direct current, the voltage of which is greater than the terminal voltage of the battery. The battery according to the invention further offers the advantage that a forming, as is the rule in the known batteries, is not necessary. Moreover, it is insignificant if some electrode material passes from one electrode to the other, since this merely produces a partial discharge, but not a contamination.

When charged, the battery according to the invention has a terminal voltage of about 1.7 volts with a 30% caustic potash solution as electrolyte and has, for example, with a positive electrode containing 100 g. of mercury and the negative electrode 500 g. of mercury—without there occurring a formation—a capacity of about 26 ampere hours. When alkaline-earth hydroxide is used in addition to alkali hydroxide with an alkaline-earth hydroxide solid phase, the suspended alkaline-earth hydroxide additionally obstructs the evolution of gas. If an alkaline-earth hydroxide solution is used by itself, the internal resistance increases substantially.

During charging, the positively charged alkali or alkaline-earth ions of the electrolyte travel to the negative electrode and, giving off their positive charge, form free alkali atoms with the mercury of the amalgam. At the same time, the negatively charged hydroxyl ions of the electrolyte travel to the positive electrodes, where they are discharged and form mercury oxide. This lowers the concentration of alkali hydroxide in the electrolyte. During discharge, the alkali atoms, while giving off electrons, pass over as ions into the electrolyte phase; at the same time, the mercury oxide, while absorbing electrons, is reduced to metallic mercury at the positive electrode. This increases the concentration of alkali hydroxide in the electrolytic solution, the foregoing is correspondingly applicable to alkaline-earth hydroxide, alkaline-earth cations, alkaline-earth atoms, and alkaline-earth amalgam.

In the known rechargeable sources of direct current, for example, the lead battery or the Edison battery, the active mass is embedded in a metallic carrier frame, for which purpose different processes have been proposed. For example, the active mass which is in the form of a solid powder or of a paste which solidifies after stirring, is pressed into a plurality of hollow spaces (pocket electrodes, grid electrodes and miniature tubular electrodes) or is precipitated from a metallic-salt solution in a sintering frame as a hydroxide precipitate or is separated electrolytically. In spite of a great number of proposals to improve the embedding of the active mass or paste, the proportion of the active mass participating in the electro-chemical reactions, in relation to the total weight of the electrodes, amounts to no more than 20 percent by weight. This unfavorable ratio is caused by the fact that the electro-chemical reactions take place only at the phase boundary surface between the surface of the particles of the active mass and the adjacent electrolytic solutions.

It is a feature of the invention that the use of carrier frames can be dispensed with.

Upon the discharge of these known batteries, electrically poorly conducting compounds form at the phase boundary surface or interface on both electrodes, for example, lead sulfate is formed in the lead battery, whereas nickel hydroxide, cadmium hydroxide, or iron hydroxide is formed in the Edison battery. These compounds become fixed on the surface of the electrodes and are only soluble with difficulty or insoluble in the electrolytic liquid. Since the electrolytic liquid diffuses only comparatively slowly through said covering layer into the interior of the electrodes, the electro-chemical reaction is effected without the portion of the active mass or paste, which is below the surface, being able to take part in the reaction.

The same considerations are also applicable for the known silver/zinc battery, as well as the silver/cadmium battery.

In contrast thereto, the electrodes of the battery according to the invention are effective throughout their entire depth, due to the specific properties of mercury which is a liquid.

REACTIONS OCCURRING AT THE POSITIVE ELECTRODE

The known types of batteries use, as the positive electrode, a mass or paste of a metallic oxide or hydroxide with two valences, namely, with a higher valence, whose cation is reduced to the lower valence upon discharge of the battery. For example, upon discharge of a lead battery, the 4-valent lead is reduced to 2-valent lead, while in an Edison battery, the 3-valent nickel is reduced to the 2-valent nickel upon discharge. Consequently, the active mass of the positive electrode always retains the property of poor electrical conductivity. Although additions of metallic powder or graphite improve the conductivity of the positive electrode, as does the introduction of the active mass or paste into a metallic sintering frame, a more or less substantial portion of the active mass is still not caused to react.

The reactions proceed more favorably in the known silver/zinc or silver/cadmium batteries, in which the active mass of the positive electrode consists of silver oxide which is reduced to metallic silver upon discharge of the battery. However, upon recharging, the silver which is a good conductor is converted into the poorly conducting silver oxide which firmly adheres to the electrode surface and obstructs the oxidation of the silver atoms in the interior of the crystal lattice of the electrode, which results in the above-described defect in the charged state. On the other hand, these batteries have the disadvantage of considerable self-discharge owing to the solubility of the silver oxide in caustic potash solution.

In the battery, according to the invention, on the other hand, the entire metallic mass of the positive electrode can be converted, upon charging of the battery, into electrochemically active oxide which does not adhere to the surface of the electrode, but is easily movable, and which can be reconverted into metallic mercury upon discharging of the battery. These reactions correspond to the reaction according to the following formula:

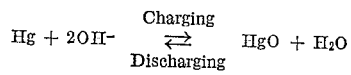

$$\text{Hg} + 2\text{OH}^- \underset{\text{Discharging}}{\overset{\text{Charging}}{\rightleftarrows}} \text{HgO} + \text{H}_2\text{O}$$

Since the HgO-particles which form during the charging of the battery are very mobile and do not adhere to the surface of the mercury, but become readily detached from the liquid metallic surface, the electrolyte can easily penetrate to the metallic electrode surface at all times, where it is able to react until the entire mercury electrode is converted into oxide. It is immaterial whether the mercury oxide is present in the green or in the reddish states. Over a period of time, the color of the oxide formed during the charging, changes from dark green to red.

During discharge, the HgO-particles floating on a larger or smaller remainder of metallic mercury are reduced to mercury, which, due to strong forces of cohesion, immediately agglomerates to form a continuous mercury layer which is a good conductor. If the entire mercury mass has been converted into oxide during the charging of the battery, the discharge of this electrode starts with the reduction of the HgO-particles, which are directly in contact with the lead wire contact.

REACTIONS OCCURRING AT THE NEGATIVE ELECTRODE

During the discharge of the known types of batteries, insoluble compounds form on the negative electrode from the originally metallic active mass or paste. Such compounds are, for example, lead sulfate in a lead battery, cadmium or iron hydroxide in an Edison battery, which compounds cover and firmly adhere to the surface of the electrode. Thus, an electric insulating layer is formed on the electrode. This layer can only be penetrated slowly by the electrolyte and impedes the discharge of active material in the interior of the metallic crystal lattice.

Upon charging of the battery, according to the invention, the cations of the electrolyte on the negative electrode are reduced to alkali atoms and/or alkaline-earth atoms which immediately diffuse into the interior of the liquid mercury and form an amalgam which is stable with respect to the electrolyte. Even after the amalgam has solidified, the alkali atoms and/or alkaline-earth atoms which continue to separate, retain such a high mobility that they are able readily to penetrate into the interior of the solid amalgam phase, thereby further increasing the concentration thereof of alkali metal or alkaline-earth metal.

During discharge, the alkali atoms or alkaline-earth atoms diffuse from the interior of the amalgam to the surface, where they pass into the electrolyte phase as ions. If the electrolyte contains, for example, potassium ions, the reaction proceeds according to the following formula:

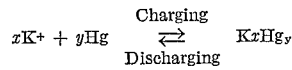

$$xK^+ + yHg \underset{\text{Discharging}}{\overset{\text{Charging}}{\rightleftarrows}} K_xHg_y$$

The proportional factors $x$ and $y$ are merely intended to show the quantitative composition of the amalgam phase. The value $x$ changes continuously during charging and discharging.

Since no insoluble products form during this reaction, the negative electrode has at all times a smooth, clean, uncovered metallic surface with excellent conductivity.

It is one of the essential features of the invention that the oxidation product, for example, the potassium ion, which forms during the discharge of the negative electrode, represents the cation which is active in the electrolyte.

The metals of the alkali group and alkaline-earth group, including magnesium, form with mercury a multiplicity of definite metallic compounds, whereby the so-called semi-stage potential of such an amalgam electrode is reduced substantially when compared with that of the pure alkali or alkaline-earth metals. For example, pure potassium in a 1-normal solution of potassium ions has under standard conditions as compared to the normal hydrogen electrode a voltage of $-2.9$ v. But if the potassium is present in the form of amalgam, said voltage is reduced under otherwise identical conditions to about $-1.8$ v.

On the other hand, hydrogen on mercury electrodes shows a very high excess voltage, so that the application of an external voltage, which is greater than the decomposition voltage of the water, does not bring about the discharge of hydrogen ions with formation of gaseous hydrogen. The excess voltage of the hydrogen on mercury electrodes depends on different factors, for example, on the temperature, the magnitude of the charging current, and so forth. It is of sufficient magnitude under the conditions under which batteries are normally operated.

Due to the co-operation of the two effects, alkali atoms or alkaline-earth atoms are separated from the electrolyte during the charging of the battery according to the present invention, without the escape of gaseous hydrogen. For the same reasons, the system remains stable, even when left standing inoperative for days, in spite of its high terminal voltage which, depending on the amalgam component and the electrolyte concentration, ranges between 1.4 and 2.3 v., and for example, is about 1.7 v.

Since the electrolyte takes a direct part in the reactions of the two electrodes, it changes its concentration of alkali hydroxide or alkaline-earth hydroxide. Said concentration decreases during charging, and increases again during discharging.

The excess amount of dissolved alkali or alkaline-earth hydroxide in a battery cell according to the invention is advisably so high that no excessive fluctuations of concentration occur due to the reatcions on the electrodes. For example, if the concentration of potassium hydroxide does not exceed 40 percent by weight during discharging and does not fall below 20 percent by weight during charging, both the terminal voltage and the internal resistance of the battery will remain approximately constant. A change in the electrolyte concentration permits modification of the properties of the battery. A high concentration of alkali hydroxide, especially saturated solutions with solid phase, results in batteries with high stability against self-discharge, which change their terminal voltage and their internal resistance only slightly when in operation. The specific internal resistance has a minimum at a specific electrolyte concentration, for example, at about 30% potassium hydroxide. Upon further dilution of the electrolyte, the terminal voltage and the internal resistance of the battery increase. On the one hand, the concentration of the caustic potash solution should be as high as possible, since the amalgam is more stable, the higher the concentration; whereas on the other hand, the concentration shall not be so high that the dissociation values drop to an unfavorably low level. The optimal concentration of the caustic potash solution ranges from about 20 to about 40%. The higher the proportional amount of electrolyte to electrodes, the lower may be the concentration, preferably in a range from 20% to 40%. These values may be exceeded both on the higher and the lower side, whereby the terminal voltage as well as the internal resistance may change appreciably.

Due to their high solubility in water, alkali hydroxides are particularly well-suited as electrolytes. In the case of alkaline-earth hydroxides, the internal resistance is higher due to the lower solubility of alkaline-earth hydroxides in water. The terminal voltage of batteries according to the invention with an alkaline-earth amalgam electrode is between 1.4 and 1.9 v., depending on the kind of alkaline-earth metal used and the concentration of alkaline-earth hydroxide. The specific internal resistance of saturated alkaline-earth hydroxide solutions increases substantially from barium hydroxide, to strontium and calcium hydroxide and to magnesium hydroxide. For example, the specific internal resistance of a saturated magnesium hydroxide solution is about 1,000 times greater than that of a 30% potassium hydroxide solution. If saturated solutions with solid phase are used, the internal resistance remains constant even after prolonged passage of current. It is also possible to use mixtures of two or more alkali hydroxides as well as mixed solutions of alkali hydroxides and alkaline-earth hydroxides as electrolytic solution. Since the separation potentials of these metals in mercury differ only slightly, an amalgam phase may form in the negative electrode during the charging, which phase is composed of several components, for example, of lithium, potassium, magnesium, and barium in mercury. Upon discharge of the battery, all of these metals, with the exception of mercury, change back into the electrolyte phase as ions.

The electrolyte may also consist of a saturated solution of alkali hydroxide and alkaline-earth hydroxide and may contain a large amount of solid alkali and alkaline-earth hydroxide. Such saturated solutions which are in equilibrium with a fairly large amount of solid substances at the bottom of the liquid, do not change their concentration during charging and discharging. Consequently, the internal resistance and the terminal voltage of such a battery with a saturated electrolytic solution and a solid phase at the bottom of the solution as an electrolyte remains approximately constant.

The electrolytic liquid may also be used in a known gel-like concentrated state.

The battery according to the invention advantageously includes, at the positive electrode, means mechanically pressing the mercury oxide forming at said electrode into the metallic residual phase, said means being in the form, for example, of a membrane or diaphragm which is fixed to the battery casing and is impermeable to the mercury oxide particles but is permeable to the electrolyte and possible gas bubbles. Alternatively, a filter plate is employed of a specific gravity smaller than mercury and greater than mercury oxide. A battery according to the invention can be used advantageously by substantially exceeding the minimum charging voltage and by employing elevated current densities, so that an accelerated charging is obtained, in which case it is advantageous to reduce the charging voltage and the current density at the start or prior to the start of gas evolution at an electrode, for example, the amalgam electrode or both electrodes. Gaseous hydrogen then develops at the negative electrode if more ions are discharged than the number of atoms emanating therefrom which are able to diffuse into the interior of the amalgam phase.

A reduction of the density of the charging current permits reduction of the speed of the ion discharge to such an extent that the freshly separated atoms are able to penetrate at once into the interior of the amalgam phase, without there occurring a strong concentration at the electrode surface.

In the case of higher alkali metal or alkaline-earth metal concentrations in the amalgam, it is advisable to reduce the charging voltage, in order to prevent the metal atoms that separate, especially after the solidification of the amalgam, from becoming concentrated at the surface of the electrodes and from developing larger amounts of hydrogen.

Reduction of the charging voltage permits adjustment of the density of the charging current, so that more atoms are always able to diffuse into the interior of the amalgam phase per unit of time than are separated at the surface of the electrode, Several embodiments of the present invention are shown by way of example in the accompanying drawing, wherein:

FIGURES 1 and 2 diagrammatically show an embodiment of a battery of rectangular shape respectively in elevation and plan;

FIGURES 3 and 4 diagrammatically show an embodiment of a battery of cylindrical shape respectively in elevation and plan;

The invention will first be described in accordance with the simplest arrangement of an electric battery with a negative electrode consisting, when charged, of the amalgam of an alkali metal and/or an alkaline-earth metal and, when discharged, of mercury, and with a positive electrode consisting, when charged, of mercury oxide or of mercury oxide and mercury and, when discharged, of mercury, and with an aqueous solution of alkali hydroxide and/or alkaline-earth hydroxide, possibly in solid phase at the bottom of a liquid phase.

Figure 1:
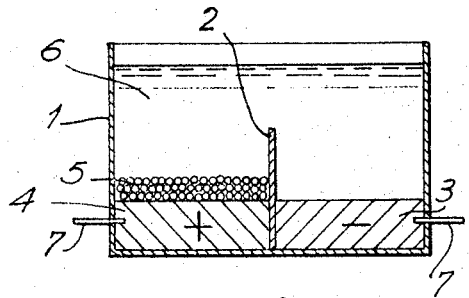

Referring now to FIG. 1, 1 is a housing of rectangular shape which is subdivided into two chambers by a partition 2. In the right chamber, at the bottom of the tank, is the amalgam 3, or the mercury of the negative electrode, whereas at the bottom of the left chamber is mercury 4 of the positive electrode. On the surface of the mercury 4 there floats, either completely or partly charged, a larger or smaller amount of a mass of small solid mercury oxide particles 5. The remaining volume of the two chambers is filled with the electrolytic solution 6 to a height above the height of the partition 2. The batterp can be placed in circuit by the current-conducting or current-withdrawing contacts 7.

Figure 3:
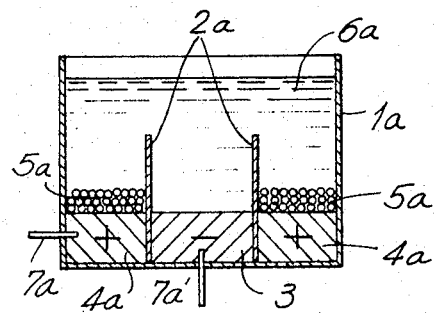
Figure 2:
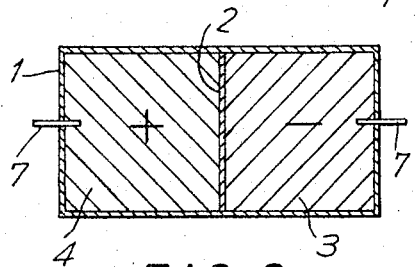
Figure 4:
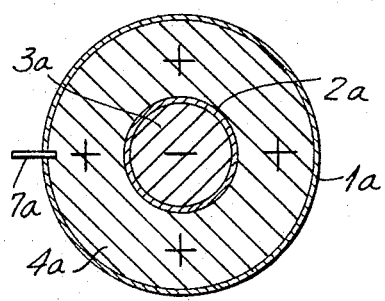

The second embodiment (FIGS. 2 and 3) is similar to that of FIG. 1, with the exception that thereon is employed a cylindrical tank 1a, into which a cylindrical partition 2a is inserted. The amalgam 3a or the mercury of the negative electrode is in the inner chamber, while the mercury 4a of the positive electrode with a covering layer of mercury oxide 5a is in the outer chamber of the cylindrical tank. The arrangement of material in the chambers may be reversed. The tank 1a is filled with electrolytic solution 6a in the same manner as in the embodiment in FIG. 1, so that it extends over the partition 2. The current-conducting or lead-in wire 7a' of the negative electrode is arranged centrally in the core axis of the tank, while the wire 7a of the positive electrode extends laterally from the tank.

The housings according to FIGS. 1 to 4 may also be closed at the top by a cover or other closure.

Figure 5:
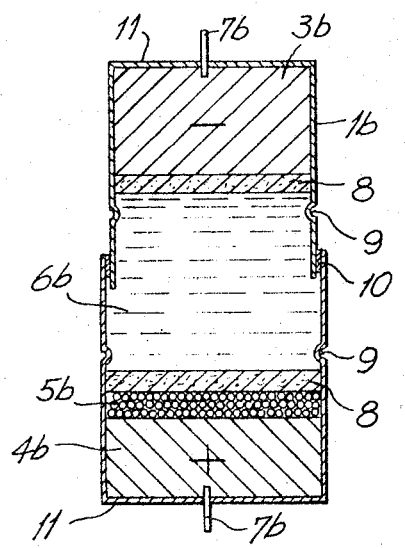
FIGURE 5 shows an embodiment with a battery with a closed housing.

In the embodiment shown in FIG. 5, the electrodes are arranged in superposed relationship in a closed housing 1b. They are spatially separated by means of two filter plates 8 which are permeable to the electrolyte and to small gas bubbles while being impermeable to mercury, amalgam and mercury oxide. The density of the plates 8 is greater than that of the mercury oxide and smaller than that of the mercury. Filter plates made, for example, of glass fiber or sintered ceramics are suitable for this purpose. The two plates 8 closely engage the inner wall of the housing 1b, but are able to slide along said wall until they reach a stop 9, for example, formed by an inward deformation in the housing. The position of the stops is determined by the maximal displacement of the two plates in the charged state of the battery. During charging, the volume of the negative electrode 3b increases owing to amalgamation, as does the volume of the positive electrode 4b owing to the formation of mercury oxide 5, while the volume of the electrolytic solution 6 decreases slightly.

The housing 1b consists of a top chamber and a bottom chamber which are slidingly engaged, and the chambers are externally sealed by means of a sealing or packing ring 10. The entire change in volume, to which the battery is subjected upon being charged and discharged, can take effect by means of this sliding connection of the two chambers, without the development of internal excess pressure.

Due to the filter plates 8 which rest on top of the mercury oxide 5b which forms, the latter is continually compressed against and into the metallic residual phase 4b of the positive electrode under slight pressure.

The electrolyte 6b fills the remaining volume of the two chambers of the housing 1 including the pores of the two filter plates 8.

The feed-in wires 7b need not project into the mercury of the electrodes. If the upper and the lower bottom plates 11 of the housing 1b are made of a metal that cannot be amalgamated, said contacts may be connected to said plates on the outside only, for example, by soldering or clamping.

Figure 6:
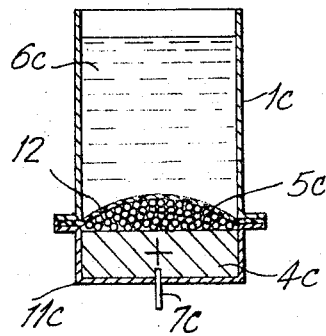
FIGURE 6 shows a modification of the embodiment of FIG. 5.

FIG. 6 illustrates another embodiment for urging the mercury oxide 5c which forms during the charging, into the metallic residual phase 4c of the positive electrode. In this embodiment, this function is effected by an elastic membrane or diaphragm 12 which is permeable to the electrolyte and to small gas bubbles and is impermeable to mercury and mercury oxide. The diaphragm is clamped in the wall of the housing 1c. A porous, elastic plastic fabric is, for example, suited for this purpose.

Upon charging of the battery, the membrane 12 bulges upwardly because of the formation of mercury oxide 5c and presses the mercury oxide against the mercury 4c due to the elasticity of the membrane 12.

When producing the battery, the amalgam of the negative electrode can be obtained, for example, by empasting an alkali or alkaline-earth metal, for example, potassium, with mercury, or else electrolytically from an alkali or alkaline-earth salt solution or hydroxide solution by using any auxiliary electrode as an anode. The positive electrode may be commercial mercury oxide, which may be compressed in the shape of tablets or cylinders. The two charged electrodes are then connected in the same manner by an electrolytic solution.

Batteries according to the invention may be operated while continually closed in a gas-tight manner.

It is also possible to charge a gas-tight closed battery according to the invention with higher charging voltages, for example, with voltage as high as 20 v.

Gaseous oxygen, which may develop at the positive electrode, would be reduced in the interior of the cell on the negative electrode, for example, by the metallic potassium in the amalgam causing the formation of KOH. The evolution of gaseous oxygen at the negative electrode, to the extent to which it is not oxidized by the mercury oxide of the positive electrode, would result in the development of an internal excess pressure in the cell. This will increase the excess voltage of the hydrogen at the amalgam electrode to such an extent that there will be no further evolution of gaseous oxygen.

In order to increase the operational safety of such a battery, the housing may be provided with a valve to allow gas to escape in case of excessively high internal excess pressure. In addition, the charging current may be interrupted in case of the developing of excessively high internal excess pressure, for instance by actuating an interruptor contact on a diaphragm of the housing.

A very efficient battery of the above-described construction is obtained by using concentrated lithium hydroxide solution as the electrolytic liquid. The terminal voltage of such a battery is about 2.0 v. Upon the deposition of 7 g. of lithium in 500 g. of mercury at the negative electrode and the simultaneous formation of 108 g. of mercury oxide at the positive electrode, this battery will have a capacity of about 26 ampere-hours. A lead battery of conventional construction having the same capacity has electrodes weighing approximately 5 kg.

The space required by the battery according to the present invention is comparatively small because of the high density of the mercury.

Batteries with higher terminal voltage can be obtained, in a manner known per se, by series connection of batteries according to the invention.

The embodiments of the invention in which an exclusive property or privilege is claimed are defined as follows:

1. A rechargeable galvanic cell having charged and discharged states, said cell comprising a liquid electrolyte, a positive and a negative electrode in contact with said electrolyte, and wherein in the charged state of the cell the positive electrode contains mercury oxide, the negative electrode contains an amalgam of mercury and at least one metal of the group consisting of alkali and the alkaline earth metals, and the electrolyte contains at least one hydroxide selected from the group consisting of alkali and the alkaline earth metals.

2. The cell as claimed in claim 1, comprising filters separating the electrodes, said filters being permeable to the electrolyte and to small gas bubbles and impermeable to mercury amalgam and mercury oxide, said filters being arranged to urge the mercury oxide which forms at the positive electrode upon charging, against and into the metallic residual phase of the positive electrode.

3. The cell as claimed in claim 1, comprising elastic porous membranes separating the electrodes, said porous membranes being permeable to the electrolyte and to small gas bubbles and being impermeable to solid mercury oxide particles, said membrane being operatively positioned with respect to the positive electrode to urge mercury oxide which forms at the positive electrode during charging, into the metallic residual phase of the positive electrode.

4. A cell as claimed in claim 1, wherein said cell comprises a housing containing the electrolyte and the electrodes, said housing being closed in gas-tight manner.

5. A cell as claimed in claim 1, comprising a gas-tight housing containing a first and a second chamber for the said positive and negative electrodes and the electrolyte, means slidably supporting the chambers together in gas-tight manner and filter means in each of said chambers permeable to said electrolyte and to small gas bubbles and being impermeable to mercury, amalgam and mercury oxides.

6. A cell as claimed in claim 1, wherein said electrolyte is a solution containing between 20 and 40% of a hydroxide selected from the group consisting of potassium hydroxide and sodium hydroxide.

7. A cell as claimed in claim 1, wherein said electrolyte is saturated and is constituted by a solid phase and a liquid phase on the solid phase.

8. A cell as caimed in claim 1, wherein said electrolyte is a solution of at least one substance selected from the group consisting of potassium hydroxide, sodium hydroxide and lithium hydroxide.

9. A cell as claimed in claim 1, wherein the amalgam of the negative electrode has a higher concentration of a metal selected from the group consisting of alkali metals and alkaline-earth metals, as compared to the concentration that can be obtained by charging the cell with electric current.

10. A cell according to claim 1 comprising means for applying a voltage to the electrodes of the said cell wherein the density of the charging current is decreased at the start of or prior to the evolution of gas at an electrode.

References Cited

UNITED STATES PATENTS

| 439,240 | 10/1890 | Gibson | 136—34 |
| 3,057,943 | 10/1962 | Strauss | 136—6 |
| 3,214,296 | 10/1965 | Smatko | 136—6 |
| 3,245,836 | 4/1962 | Agruss | 136—83 |

WINSTON A. DOUGLAS, Primary Examiner

A. SKAPARS, Assistant Examiner

U.S. Cl. X.R.

136—83